United States Patent [19]

Milum

[11] 4,200,909
[45] Apr. 29, 1980

[54] HIGH VOLTAGE POWER SUPPLY FOR ELECTROSTATIC AIR CLEANER

[75] Inventor: Jimmy L. Milum, Boone County, Ark.

[73] Assignee: Emerson Electric Co., Saint Louis, Mo.

[21] Appl. No.: 935,353

[22] Filed: Aug. 21, 1978

[51] Int. Cl.² .......................................... H02M 7/00
[52] U.S. Cl. ................................. 363/144; 361/235; 361/331
[58] Field of Search ................. 55/139; 361/235, 331, 361/380, 392; 363/59–61, 144, 146

[56] References Cited

U.S. PATENT DOCUMENTS

| Re. 25,317 | 1/1963 | McCoy | 361/392 X |
| 3,721,865 | 3/1973 | Rademaker et al. | 361/380 |

Primary Examiner—William M. Shoop
Attorney, Agent, or Firm—Charles E. Markham

[57] ABSTRACT

Components of a high voltage power supply are detachably mounted for replacement in predetermined positions in a rigid casing of dielectric material and arranged therein so as to provide the required intercomponent and component to casing electrical clearances for potential differences in excess of 600 volts.

8 Claims, 10 Drawing Figures

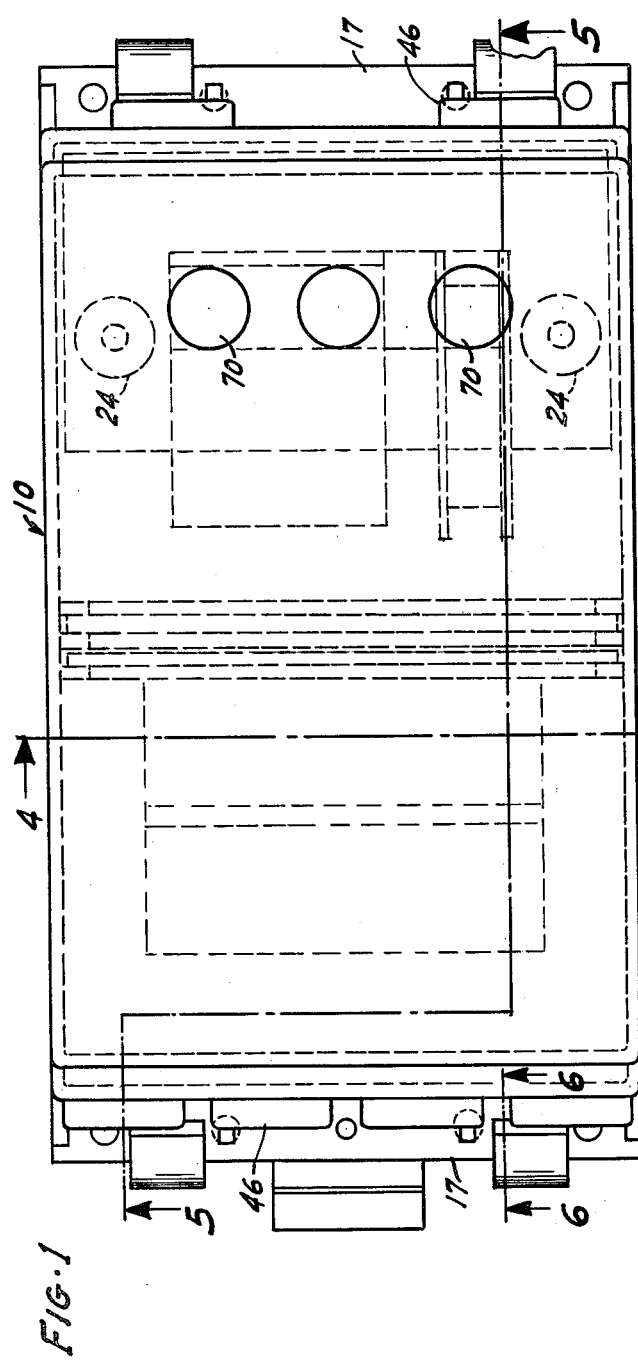
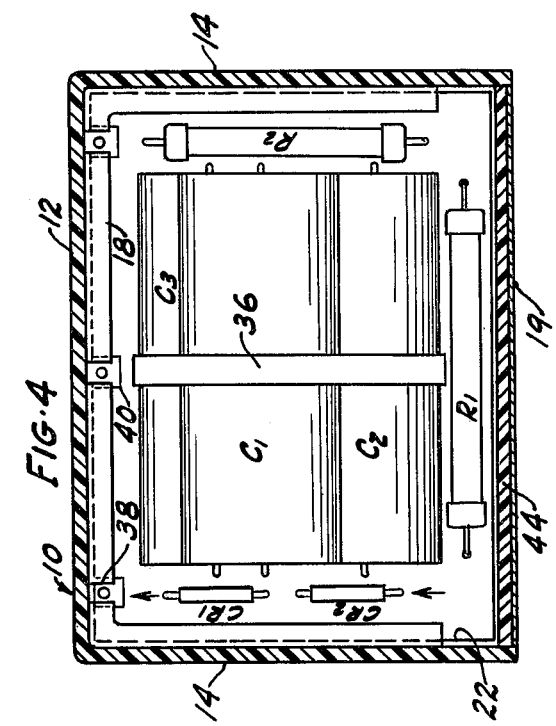
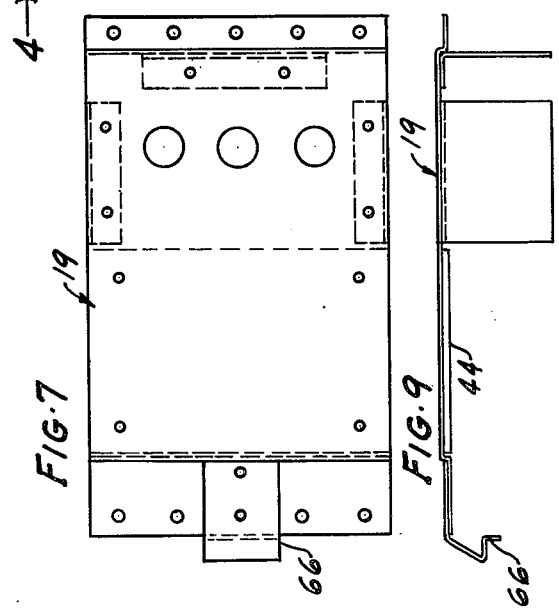
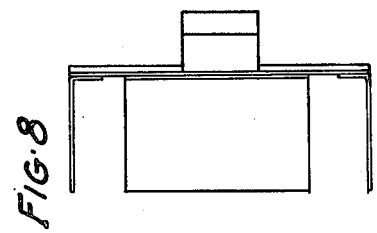
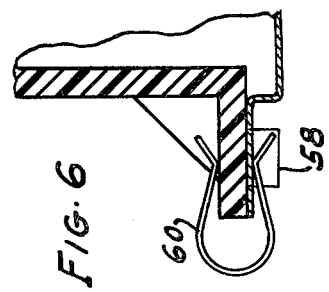

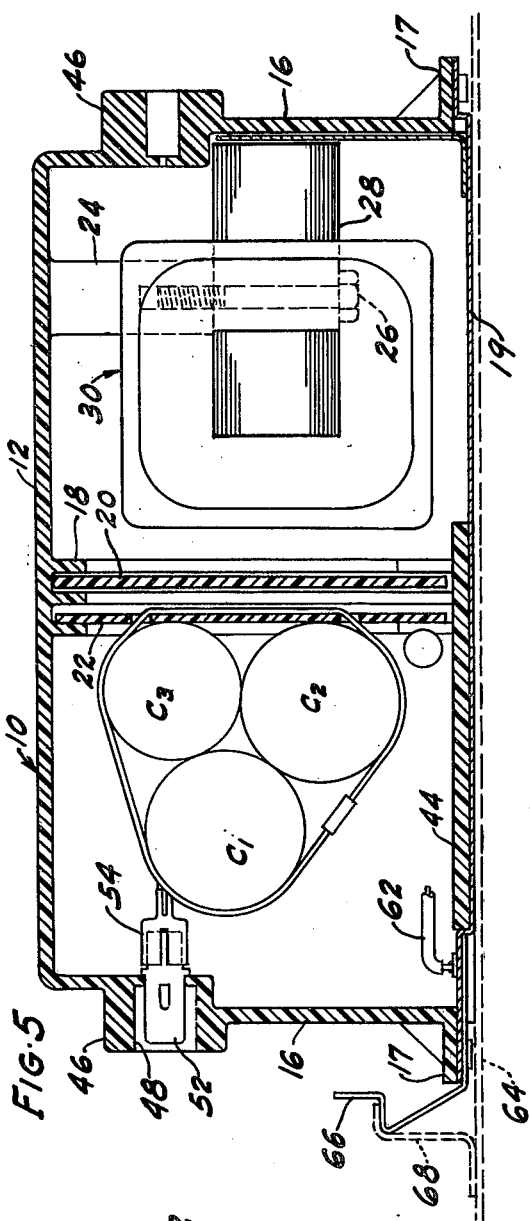
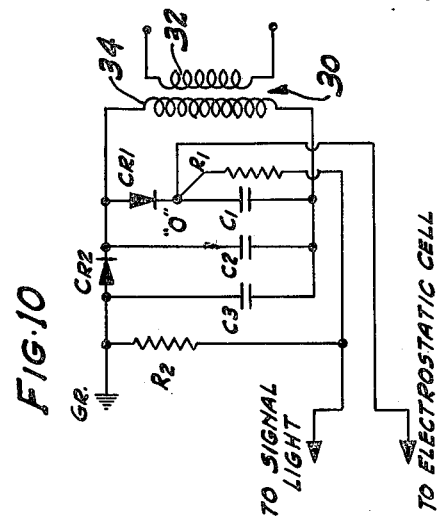
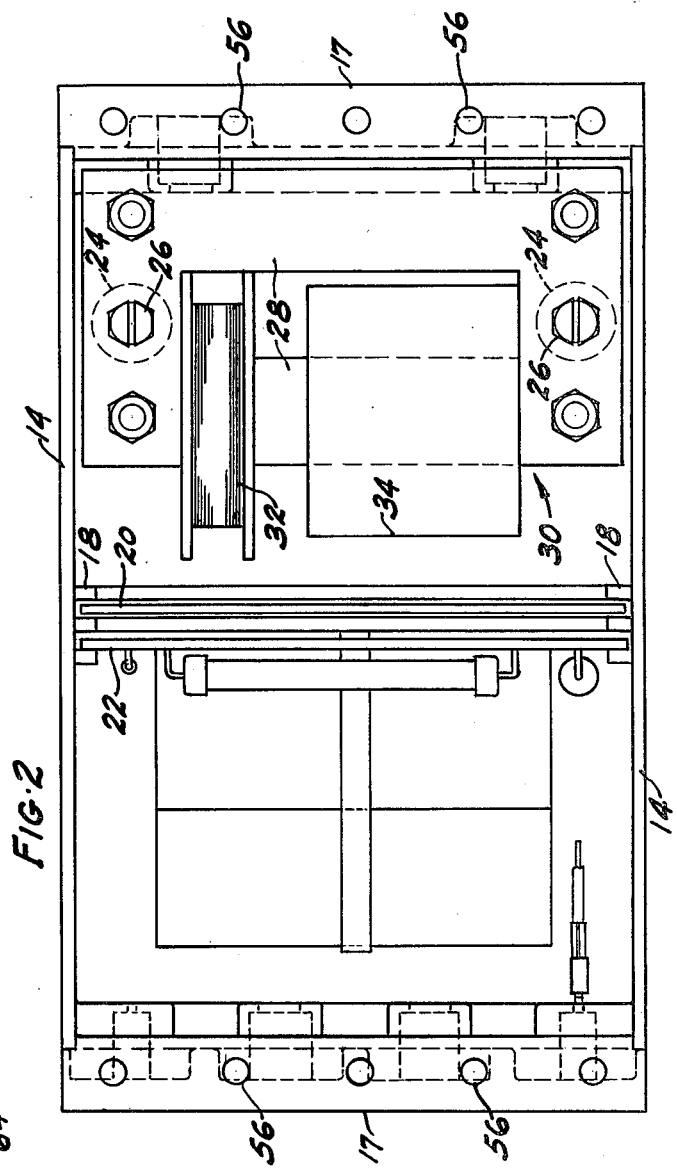
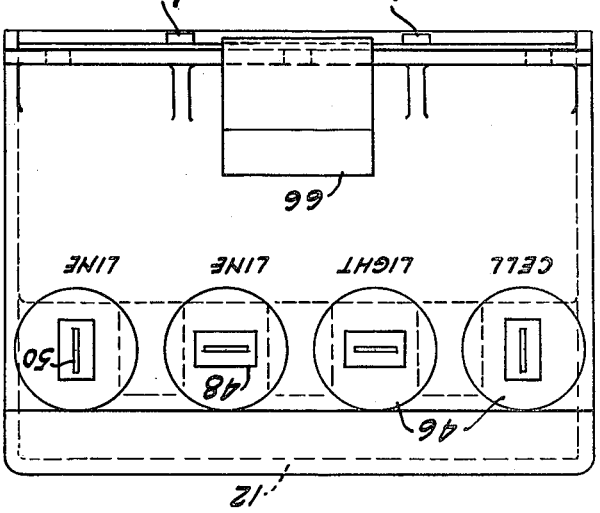

HIGH VOLTAGE POWER SUPPLY FOR ELECTROSTATIC AIR CLEANER

This invention pertains to devices for converting a relatively low voltage A. C. commercial power supply to a high voltage D. C. supply for the operation of electrostatic air cleaners. It particularly pertains to a compact device of this kind in which the components are conveniently and separately replaceable.

BACKGROUND OF THE INVENTION

Heretofore, the components of high voltage power supply devices of this kind were usually enclosed in a metal casing or mounted in an open metal frame to be eventually mounted in a compartment in a metal electrostatic cell. In either case, adequately insulating the high voltage components from the metal casing or frame required air gap clearances or more costly barriers or insulating material which substantially increased the size or cost of the device. Also, the mounting and arrangement of the components in these prior devices was such as to require the services of highly trained people to accomplish replacement of any inoperative component. In other prior devices of this kind, the components were frequently potted in a metal casing in a thermoplastic or thermosetting material which permitted reducing the size of the device somewhat but added the cost of potting and obviously precluded the replacement of any inoperative components.

Recently, electrostatic air cleaners which include a high voltage power supply device within their frames are frequently mounted in openings in the ceiling or sidewall of a living space between the joists or studs so that minimizing that portion of the opening occuppied by the high voltage power supply is highly desirable. It is also highly desirable in the interest of economy to construct and arrange the high voltage power supply device so that any of its components which become inoperative in use may be conveniently removed and replaced in the proper position in the field.

OBJECTS OF THE INVENTION

Accordingly, it is the primary object of this invention to provide a generally new and improved high voltage power supply device for operation of an electrostatic air cleaner, which device is particularly compact and in which the components thereof are mounted in a casing for convenient removal and replacement. p A further object is to mount the components in predetermined positions so that the required electrical clearances will be maintained when replacements of components are made.

A further object is to provide a particularly compact, high voltage, power supply device for the operation of electrostatic air cleaners in which the components thereof are mounted in predetermined positions for convenient removal and replacement in a casing of rigid dielectric material.

Other objects and advantages will appear when reading the following description in connection with the accompanying drawings.

IN THE DRAWINGS

FIG. 1 is a top plan view of a high voltage power supply device constructed in accordance with the present invention;

FIG. 2 is a bottom plan view of the device shown in FIG. 1 with the detachable bottom cover removed;

FIG. 3 is an end elevational view of the device shown in FIG. 1;

FIG. 4 is a transverse cross-sectional view taken along line 4—4 of FIG. 1;

FIG. 5 is a longitudinal cross-sectional view taken along line 5—5 of FIG. 1;

FIG. 6 is a fragmentary cross-sectional view taken along line 6—6 of FIG. 1, showing the means of attaching the bottom cover;

FIGS. 7, 8, and 9 are reduced size plan, side, and elevational views, respectively, of the removable metal casing cover; and FIG. 10 is a diagram of a typical high voltage power supply of this kind, showing the components and their interconnection.

DESCRIPTION

Referring to the drawings in more detail, the device comprises an elongated rectangular casing generally indicated at 10, having a horizontal top wall 12, two vertical sidewalls 14, and two vertical end walls 16 having horizontal flanges 17 at their lower edges. The casing 10 is preferably constructed as a molding of suitable thermoplastic material having the required rigidity and dielectric strength. A detachable metal cover 19 forms the bottom wall of casing 10.

Extending horizontally along the top wall 12 and vertically along the sidewalls 14 are three parallel, internally extending projections 18 spaced so as to form two parallel grooves. A divider board 20 dividing the casing into two compartments is slidably entered into one groove and a component mounting board 22 is slidably entered into the other groove. Both the divider board 20 and mounting board 22 are constructed of dielectric material.

Depending from the top wall 12 in the right-hand compartment, with reference to FIGS. 2 and 5, is a pair of laterally spaced, integrally formed posts 24 to the lower ends of which is attached by screws 26 the laminated core 28 of a voltage step-up transformer generally indicated at 30. The transformer 30 further includes a primary winding 32 and a secondary winding 34.

Mounted on the slidably entered dielectric mounting board 22 in the left-hand compartment of the casing is a pair of diodes $CR_1$ and $CR_2$, a pair of resistors $R_1$ and $R_2$, and three capacitors $C_1$, $C_2$, and $C_3$, see FIGS. 4 and 10. The capacitors, diodes, and resistors are positioned and mounted on the left-hand side of mounting board 22 by extending their attached short leads through small perforations in the mounting board and by soldering the ends thereof to a component interconnector circuit mounted on the opposite side of the board, which interconnector circuit is preferably printed on the mounting board. The positions of the diodes and resistors and the direction of current flow through the diodes is designated on the mounting board 22, see FIG. 4.

The relatively large capacitors are further supported and held in position by a flexible nylon band 36 passing around the capacitors and extending through slit apertures in the mounting board. Interior connector leads connecting the transformer secondary winding 34 with the board mounted components and connecting the primary winding 32 with exterior leads extend through interruptions 38 in the groove forming projections 18 and aligned notches 40 in the divider and mounting boards 20 and 22, see FIG. 4. Suitable detachable connectors (not shown) for connecting and disconnecting the transformer secondary winding 34 with the board mounted component interconnector circuit are provided so that the mounting board 22 may be conveniently disconnected from the transformer and separately removed from the casing. There is a sheet of insulating material 44 attached to the inside of detachable metal cover member 19 extending substantially over the left-hand compartment of the casing.

The left-hand end wall 16 of the casing has four exteriorly extending cylindrical bosses 46 which have external recesses 48 therein for receiving and shielding external lead connectors. The bottom walls of recesses 48 have slit apertures 50 into which suitable terminal elements 52 are inserted and retained. Terminal elements 52 have interior and exterior extensions which are received in connectors 54 attached to the ends of interior and exterior leads. There are also two similarly recessed and perforated bosses 46 on the right-hand end wall 16 of the casing equipped with terminal elements 52, thereby to provide an optional connection between the transformer primary winding 32 and a commercial power source.

The ends of metal cover member 19 extend over the flanges 17 of end walls 16 and have circular perforations 56 therein which receive short cylindrical bosses 58 formed integral with flanges 17 to hold the cover 19 in position. The metal cover 19 is detachably connected to the flanges 17 by spring clips 60, see detail FIG. 6. The electrical system is grounded through a lead 62 connected to the metal cover plate 19, see FIG. 5.

The device is adapted to be mounted and detachably connected in the metal frame 64 of an electrostatic air cleaner with the metal cover 19 of the device in contact with the metal frame of the air cleaner, see FIG. 5, so that the device is grounded at the same potential as the grounded plates of the air cleaner. To this end suitable metal clips 66 attached to the metal cover member 19 are provided for detachable connection to suitable metal clip retainers 68 attached to the air cleaner frame. The casing is provided with three ventilating apertures 70 in the top wall portion extending over the right-hand transformer compartment.

Referring to the diagram, FIG. 10, the primary winding 32 of the transformer 30 is connected across an A.C. commercial power source. The capacitors $C_1$ and $C_3$ are connected across the transformer secondary winding 34 through oppositely poled diodes $CR_1$ and $CR_2$ so that the voltage appearing at point "0" is double that of the secondary winding output. The capacitor $C_2$, which is somewhat smaller than capacitors $C_1$ and $C_3$, is connected directly across the secondary winding and functions as a filter to maintain a constant voltage at point "0." One output lead from point "0" is connected to the ionizing elements and positively charged plates of an electrostatic air cleaner cell. Another output lead from point "0" is connected through a resistor $R_1$ to a signal light and through resistors $R_1$ and $R_2$ to ground, as indicated at 62 in FIG. 5.

It will be seen from the foregoing that the transformer 30 and component mounting board 22 with components attached thereto may be conveniently removed and replaced in their predetermined positions by semi-skilled workmen. Also, faulty components may be conveniently removed from the mounting board 22 and replaced and reconnected in the field or in nearby workshops by skilled workmen. The mounting board 22 may in some cases function also as a dividing board to divide the casing into two compartments, thereby to permit dispensing with the dividing board 20.

What is claimed is:

1. A high voltage power supply device for electrostatic air cleaners comprising a rectangular casing formed as a molding of dielectric material and having a top wall, two side walls, two end walls and a detachable cover member of conductive metal forming a bottom wall, a conveniently removable mounting board of dielectric material positioned in said casing so as to form a dividing wall dividing said casing into two compartments, a voltage step up transformer detachably connected to a wall of said casing and positioned in one of said compartments, electrical components including a pair of diodes and a pair of capacitors for converting the output of said transformer to a D.C. output of higher voltage mounted on said mounting board and positioned in the other of said compartments, and terminals mounted in a wall of said casing for connection of interior and exterior leads.

2. The device claimed in claim 1 which further includes a divider board of dielectric material positioned adjacent to and parallel with said mounting board and on the said one compartment side thereof.

3. A high voltage power supply device for electrostatic air cleaners comprising an elongated rectangular casing of dielectric material having a top wall, two sidewalls, and two end walls and having a detachable metal cover member forming a bottom wall, a component mounting board of dielectric material slidably entered into grooves formed in the top and sidewalls of said casing and being retained in said casing by said detachable cover member and said component mounting board forming a wall dividing said casing into two compartments, screw-threaded means detachably connecting said transformer to said casing, voltage doubler circuit means for converting the output of said transformer to D.C. and doubling the transformer output voltage and including as components thereof a pair of capacitors, a pair of diodes mounted on said mounting board and positioned in the other of said compartments, and terminals mounted in an end wall of said casing for connection therewith of detachable interior and exterior lead connectors.

4. The device claimed in claim 3 which includes circuit connections interconnecting said voltage doubler circuit components printed on said mounting board.

5. The device claimed in claim 3 which includes detachable lead connectors for connecting the secondary of said transformer with said doubler circuit means.

6. The device claimed in claim 3 in which one side of the output of said doubler circuit means is grounded to said removable cover member through resistance means.

7. The device claimed in claim 3 in which said components of said voltage doubler circuit means are mounted in predetermined designated positions on said mounting board.

8. The device claimed in claim 3 which includes a sheet of insulating material overlying the interior side of said removable metal cover and extending substantially over that portion thereof enclosing said other compartment of said casing.

* * * * *